(12) United States Patent
Usuda et al.

(10) Patent No.: US 8,476,553 B2
(45) Date of Patent: Jul. 2, 2013

(54) METHOD OF DIVIDING WORKPIECE

(75) Inventors: Satoshi Usuda, Ota-Ku (JP); Kiyoshi Ohsuga, Ota-ku (JP); Masaru Nakamura, Ota-ku (JP)

(73) Assignee: Disco Corporation, Tokyo (JP)

( * ) Notice: Subject to any disclaimer, the term of this patent is extended or adjusted under 35 U.S.C. 154(b) by 74 days.

(21) Appl. No.: 13/223,941

(22) Filed: Sep. 1, 2011

(65) Prior Publication Data
US 2012/0061361 A1    Mar. 15, 2012

(30) Foreign Application Priority Data

Sep. 10, 2010 (JP) ................................. 2010-202847

(51) Int. Cl.
*B23K 26/38* (2006.01)
(52) U.S. Cl.
USPC ............ 219/121.85; 219/121.68; 219/121.69; 219/121.67; 219/121.72; 219/121.81; 219/121.83; 219/121.62
(58) Field of Classification Search
USPC .............................. 219/121.69, 68, 83, 121.81
See application file for complete search history.

(56) References Cited

U.S. PATENT DOCUMENTS

| | | | | |
|---|---|---|---|---|
| 5,235,263 A * | 8/1993 | Boston et al. | ................. | 318/701 |
| 5,653,900 A * | 8/1997 | Clement et al. | .......... | 219/121.68 |
| 6,545,250 B2 * | 4/2003 | Hartmann et al. | ....... | 219/121.83 |
| 6,734,392 B2 * | 5/2004 | Philipp et al. | ............. | 219/121.82 |
| 7,297,972 B2 * | 11/2007 | Bruland | ..................... | 250/559.3 |
| 7,618,878 B2 * | 11/2009 | Nakamura et al. | ............ | 438/463 |
| 7,723,639 B2 * | 5/2010 | Ellin et al. | ............... | 219/121.61 |
| 7,964,819 B2 * | 6/2011 | Bruland | .................... | 219/121.62 |
| 8,338,746 B2 * | 12/2012 | Sun et al. | .................. | 219/121.72 |
| 2001/0023862 A1 * | 9/2001 | Hartmann et al. | ....... | 219/121.83 |
| 2002/0198622 A1 * | 12/2002 | Dinauer et al. | ............... | 700/166 |
| 2006/0000816 A1 * | 1/2006 | Hogan | ...................... | 219/121.75 |
| 2008/0268619 A1 * | 10/2008 | Nakamura | .................... | 438/463 |
| 2008/0293220 A1 * | 11/2008 | Nakamura | .................... | 438/463 |
| 2009/0142906 A1 * | 6/2009 | Nakamura | .................... | 438/463 |
| 2009/0149002 A1 * | 6/2009 | Watanabe et al. | ............. | 438/463 |
| 2009/0197395 A1 * | 8/2009 | Nakamura et al. | ............ | 438/463 |
| 2009/0215245 A1 * | 8/2009 | Nakamura | .................... | 438/463 |
| 2009/0215246 A1 * | 8/2009 | Kitahara et al. | ............. | 438/463 |
| 2009/0242522 A1 * | 10/2009 | Baird et al. | ............. | 219/121.61 |
| 2009/0289042 A1 * | 11/2009 | Ueda | ........................ | 219/121.72 |
| 2009/0298263 A1 * | 12/2009 | Watanabe et al. | ............. | 438/463 |
| 2009/0298264 A1 * | 12/2009 | Arai et al. | ...................... | 438/464 |
| 2009/0309532 A1 * | 12/2009 | Ueda | .............................. | 318/600 |
| 2011/0056922 A1 * | 3/2011 | Ueki | ........................ | 219/121.72 |
| 2011/0210103 A1 * | 9/2011 | Bruland et al. | .......... | 219/121.67 |

FOREIGN PATENT DOCUMENTS

| | | |
|---|---|---|
| JP | 2002-192370 | 7/2002 |
| JP | 2005-028423 | 2/2005 |

* cited by examiner

*Primary Examiner* — Joseph M Pelham
*Assistant Examiner* — Jimmy Chou
(74) *Attorney, Agent, or Firm* — Greer, Burns & Crain, Ltd.

(57) ABSTRACT

A method of dividing a workpiece includes: forming a pre-machining alteration region in the inside of a region in which no device is formed; detecting the position of the pre-machining alteration region through infrared imaging by imaging means, to thereby recognize a deviation between the pre-machining alteration region and a planned dividing line as machining position correction information; and forming a main machining alteration region by utilizing the machining position correction information, whereby the workpiece can be accurately divided along the planned dividing lines into individual devices.

1 Claim, 6 Drawing Sheets

METHOD OF DIVIDING WORKPIECE

BACKGROUND OF THE INVENTION

1. Field of the Invention

The present invention relates to a method of dividing a wafer by forming alteration regions in the inside of the wafer by laser beam machining.

2. Description of the Related Art

As a method for dividing a wafer such as a semiconductor wafer or an optical device wafer along streets, there has been tried a method in which a pulsed laser beam capable of being transmitted through the wafer is utilized. In the dividing method based on the use of a pulsed laser beam, the wafer is irradiated with the pulsed laser beam having such a wavelength as to be transmitted through the wafer, from one side of the wafer and while adjusting the beam condensing point to a position in the inside of the wafer, whereby alteration regions are continuously formed in the inside of the wafer along the streets. Thereafter, an external force is applied to the wafer along the planned dividing lines where material strength has been lowered by the formation of the alteration regions, to thereby divide the workpiece (see, for example, Japanese Patent No. 3408805 and Japanese Patent Laid-Open No. 2005-28423).

In the machining by use of the pulsed laser beam, the positional relationship between an irradiation head for irradiation with the pulsed laser beam and an imaging means for imaging the surface of the wafer may be varied relatively during machining, depending on temperature or the like which varies in the process of machining. Therefore, during machining, whether or not the position of actual machining coincides with the position of machining intended has to be checked through imaging by the imaging means.

SUMMARY OF THE INVENTION

In the case where the alteration region is formed in the inside of the wafer by laser beam machining, however, a crack may be generated in the wafer surface due to the alteration region formed near the wafer surface. When it is attempted to image the alteration region in order to recognize the position of machining by the laser beam, the crack may also be imaged simultaneously. Furthermore, the crack is not necessarily be generated just on the upper side of the alteration region. Consequently, it may be impossible for the imaging means to recognize accurately the position of the alteration region.

Accordingly, it is an object of the present invention to provide a machining method by which a wafer can be divided accurately along planned dividing lines while properly detecting the machining position, in the case of forming an alteration region in the inside of the wafer by laser beam machining.

In accordance with an aspect of the present invention, there is provided a method of dividing a workpiece, the workpiece having on its surface a device formation region in which devices are formed in regions demarcated by a plurality of planned dividing lines formed in a grid pattern and a device non-formation region which surrounds the device formation region, the method including the steps of: irradiating the device non-formation region with a pulsed laser beam having such a wavelength as to be transmitted through the workpiece, thereby to form a pre-machining alteration region in the inside of the workpiece in the device non-formation region; imaging the pre-machining alteration region by imaging means using infrared rays, thereby to detect a deviation between the position of irradiation with the laser beam and the position of the planned dividing line as machining position correction information; and correcting the position of irradiation with the laser beam on the basis of the machining position correction information and irradiating the workpiece with a pulsed laser beam having such a wavelength as to be transmitted through the workpiece, along the planned dividing line, to thereby form a main machining alteration region serving as a starting point of division.

Thus, according to the aspect of the present invention as above, the pre-machining alteration region is formed in the inside of that region of the workpiece in which no device is formed, the position of the pre-machining alteration region actually formed is detected by infrared imaging, the deviation of this position from the position of the planned dividing line is recognized as machining position correction information, and, by utilizing the machining position correction information, main machining alteration regions are formed in that region of the workpiece in which the devices are formed. Consequently, the workpiece can be accurately divided along the planned dividing lines into individual devices.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
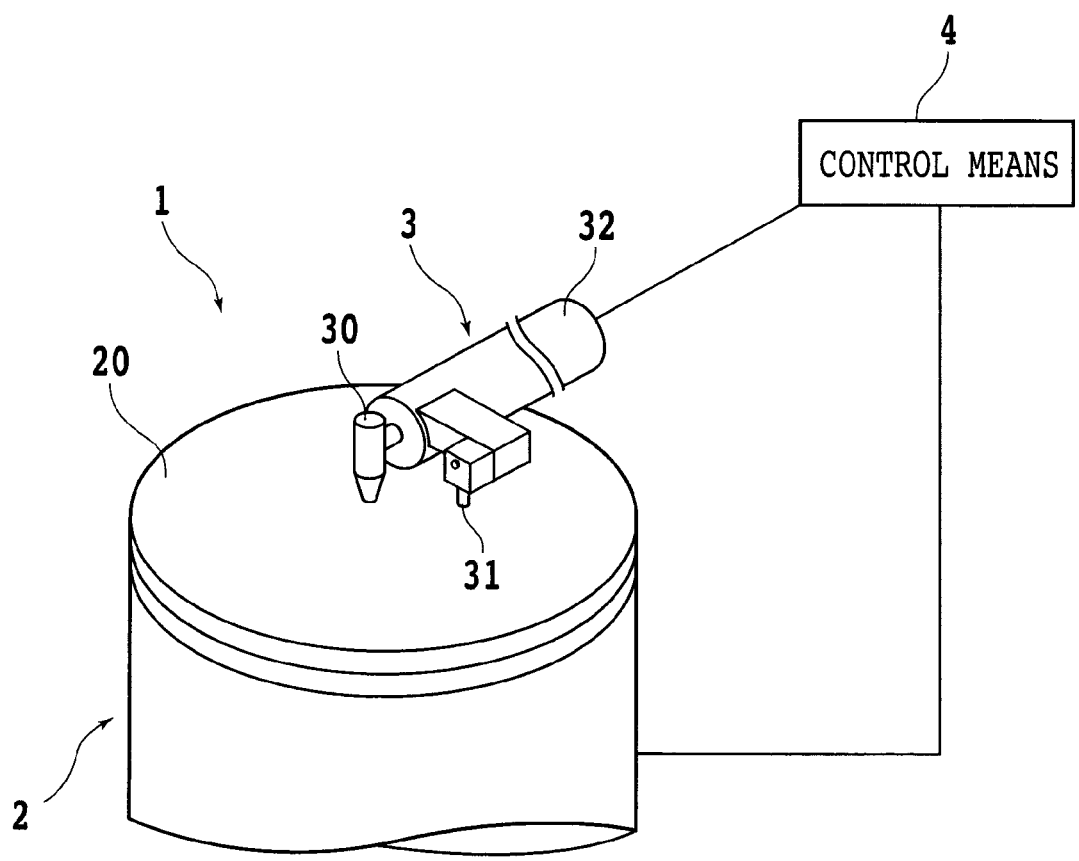
FIG. 1 is a perspective view showing an example of a laser beam machining apparatus.
Figure 1:
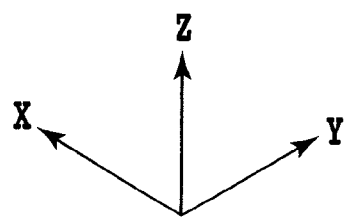

A laser beam machining apparatus 1 shown in FIG. 1 includes holding means 2 for holding a workpiece such as a wafer, and laser beam machining means 3 for applying laser beam machining to the workpiece held by the holding means 2. The holding means 2 and the laser beam machining means 3 can be relatively moved in an X-direction, a Y-direction and a Z-direction under control of control means 4. The control means 4 has a CPU and a storage element such as a memory.

The holding means 2 is rotatable, and its upper surface constitutes a holding surface 20. On the other hand, the laser beam machining means 3 includes an irradiation head 30 for radiating a laser beam downward, an imaging unit 31 for imaging the workpiece so as to detect a position for irradiation with the laser beam, and a support section 32 for supporting the irradiation head 30 and the imaging unit 31. The imaging unit 31 has a predetermined positional relation with the irradiation head 30, and is, for example, preliminarily adjusted so that the imaging unit 31 is located on an extension in the X-direction of the irradiation head 30. The imaging unit 31 is configured to be capable of imaging by visible rays and by infrared rays.

Figure 2:
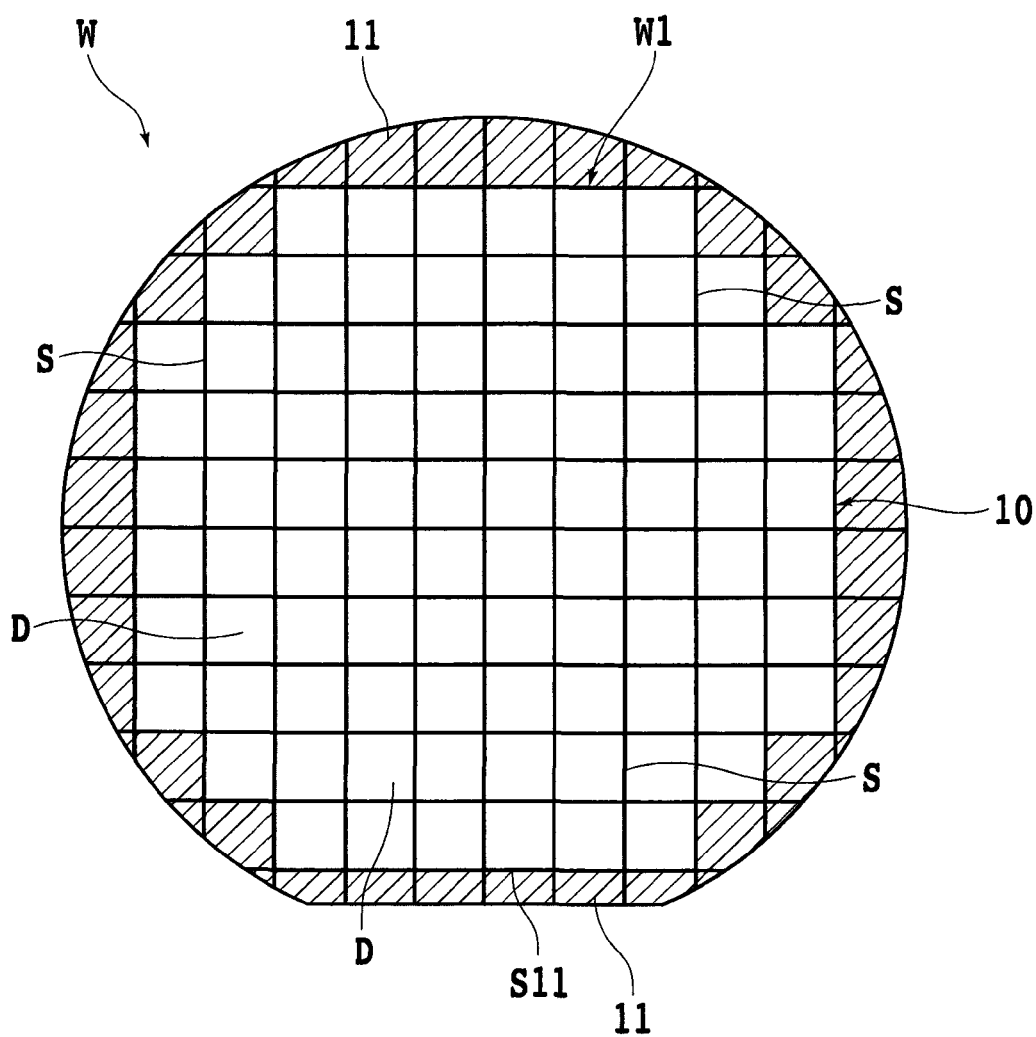
FIG. 2 is an illustration of an example of a wafer.

The workpiece W shown in FIG. 2 has a surface W1 formed with planned dividing lines S in a grid pattern, with devices D being formed in regions demarcated by the planned dividing lines S. The device D is a part to be a product after division of the workpiece W along the planned dividing lines S. Hereafter, the region in which the devices D to be products are formed will be referred to as device formation region 10. On the other hand, that region which surrounds the device formation region 10, in which the devices D to be products are not formed and which is hatched in the FIG. 2 will be referred to as device non-formation region 11.

In the following, description will be made of a case where a pulsed laser beam is condensed into the inside of the workpiece W configured as above along the planned dividing lines S to form alteration regions, and an external force is exerted on the workpiece W along the planned dividing lines S so as to divide the workpiece W into individual devices D, with the alteration regions as starting points of division. Incidentally, the term "alteration region" means a region different from the surroundings in density, refractive index, mechanical strength or other physical property. Examples of the alteration region include a melting treatment region, a crack region, a dielectric breakdown region, a refractive index variation region, and a region of a combination of these. In addition, the workpiece as an object of machining is not specifically restricted. Examples of the workpiece include: silicon wafers; semiconductor wafers based on gallium-arsenic, silicon carbide or the like; tacky members such as DAF (die attach film) provided on the back side of a wafer for chip mounting; packages of semiconductor products; inorganic substrates based on ceramic, glass, sapphire or the like; various electronic parts such as a liquid crystal display driver, etc.; and various materials to be machined which require machining positional accuracy on the micrometer order. In the following, description will be made of a case where the workpiece W is a silicon wafer having a thickness of 55 µm.

(1) Position Information Acquisition Step

First, the workpiece W is held by the holding means 2 in the state in which the surface (face side) W1 of the workpiece W is exposed. Then, the surface W1 of the workpiece W is imaged by the imaging unit 31 shown in FIG. 1, the planned dividing line S along which an alteration region is to be formed is detected, and the position information is stored into the storage element provided in the control means 4. Here, a process may be adopted in which all the planned dividing lines S are detected, and the position data are sequentially stored. Or, alternatively, another process may be adopted in which the planned dividing line S to be a reference is detected, the position information is stored, and position data on other planned dividing lines are calculated based on the value of spacing between the adjacent planned dividing lines.

(2) Pre-Machining Step

Figure 3:
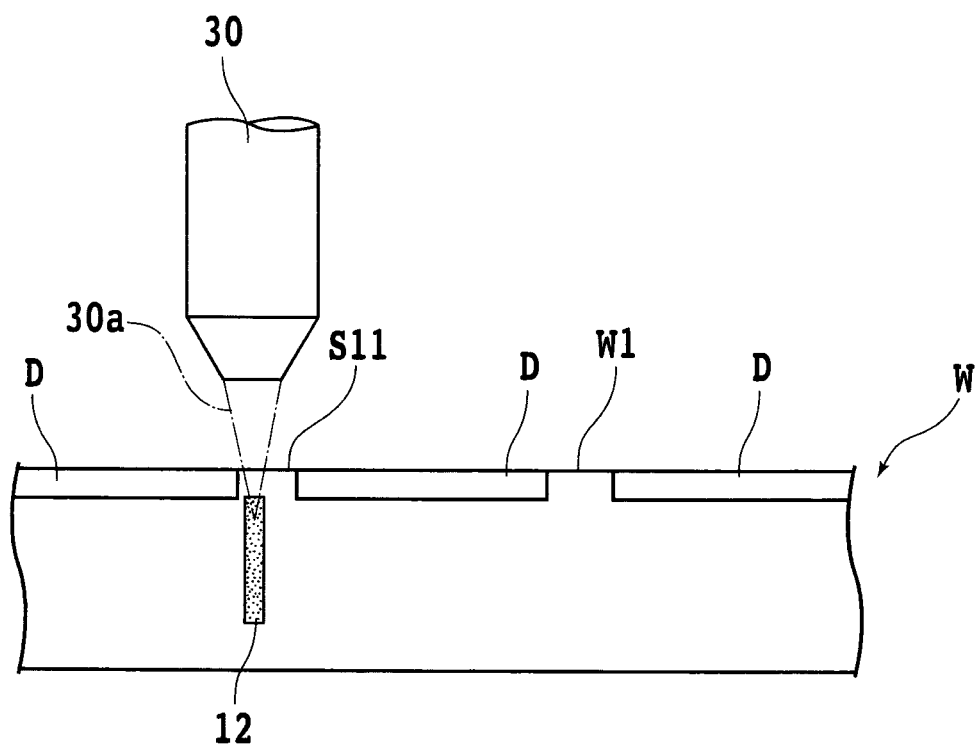
FIG. 3 is a sectional view showing schematically a state in which a pre-machining alteration region is formed.
Figure 4:
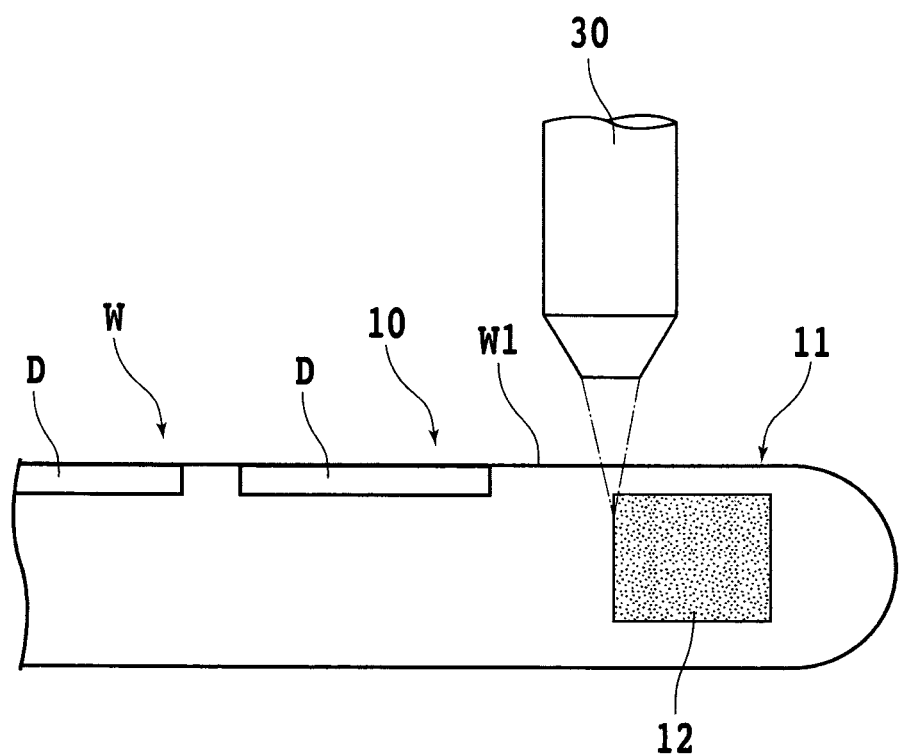
FIG. 4 is a sectional view showing schematically the state in which the pre-machining alteration region is formed, as viewed from another angle.

After the position information on the planned dividing line(s) S is acquired by the control means 4, Y-direction alignment (position matching) between the irradiation head 30 and the planned dividing line S along which to form the alteration region is conducted based on the pre-adjusted positional relationship between the imaging unit 31 and the irradiation head 30. For example, in the case of irradiating the workpiece W with the pulsed laser beam along the planned dividing line S11 shown in FIG. 2, the irradiation head 30 is positioned on the upper side of the planned dividing line S11 in the device non-formation region 11. Then, as shown in FIG. 3, the pulsed laser beam 30a is condensed to a predetermined depth in the inside of the workpiece W, and the holding means 2 is moved in the X-direction. As a result, as shown in FIG. 4, a pre-machining alteration region 12 is formed in the inside of the device non-formation region 11, within the range of the width of the device non-formation region 11. For example, the output of the pulsed laser beam 30a is set to 0.08 W, the wavelength of the pulsed laser beam 30a is set to 1064 nm, which is a wavelength permitting transmission through silicon, and the repetition frequency is set to 80 kHz. Besides, the moving speed of the holding means 2 in the X-direction (machining rate) is set to 180 mm/s, and the condensing position of the pulsed laser beam 30a is set to −27 µm in the depth direction with reference to the surface W1.

The pre-machining alteration region 12 thus formed is useful for later detection of a positional deviation between the position of actual irradiation with the laser beam and the center of the planned dividing line. In the pre-machining step, the pre-machining alteration region 12 is formed in the region in which no device is formed. Therefore, even if the pre-machining alteration region 12 is formed at a position deviated from the center of the planned dividing line, it would not adversely affect the accurateness of division of the device formation region 10.

(3) Correction Information Acquisition Step

Figure 5:
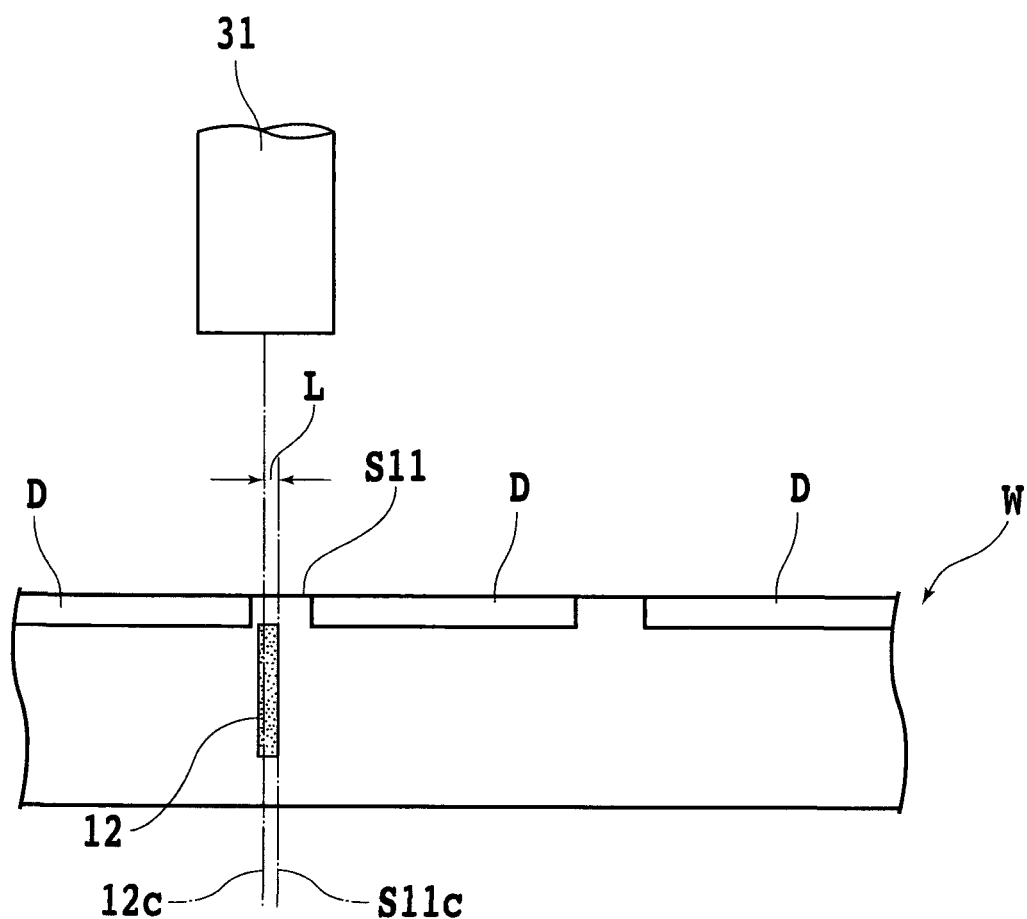
FIG. 5 is a sectional view showing schematically a state in which the pre-machining alteration region is imaged.

Next, as shown in FIG. 5, the imaging unit 31 is positioned on the upper side of the pre-machining alteration region 12 formed in the pre-machining step, and the pre-machining alteration region 12 is imaged by infrared imaging. In this instance, no crack has been generated during formation of the pre-machining alteration region, so that recognition of the machined part can be made without being obstructed by a crack. The Y-coordinate of the center S11c of the planned dividing line S11 has been recognized by the control means 4 in the position information acquisition step. By a process in which the center 12c of the pre-machining alteration region 12 thus detected is determined by image processing, therefore, it is possible for the control means 4 to calculate the deviation L between the center S11c of the planned dividing line S11 and the center 12c of the pre-machining alteration region 12. Incidentally, a configuration may be adopted in which the image acquired by infrared imaging is displayed on a monitor in the system, then the operator grasps the deviation on the screen, and the operator inputs the deviation so that the deviation is stored into the control means 4.

If the initial positional relation between the irradiation head 30 and the imaging means 31 is maintained, no deviation would be generated between the center 12c of the pre-machining alteration region 12 and the center S11c of the planned dividing line S11. However, the positional relation between the irradiation head 30 and the imaging means 31 may be varied due, for example, to a variation in temperature during the machining process or the like. In such a case, the value of the deviation L is provisionally stored in the storage element such as a memory incorporated in the control means 4. The deviation L becomes machining position correction information at the time of irradiation of the device region 10 with a pulsed laser beam in a main machining step to be conducted later.

(4) Main Machining Step

Figure 6:
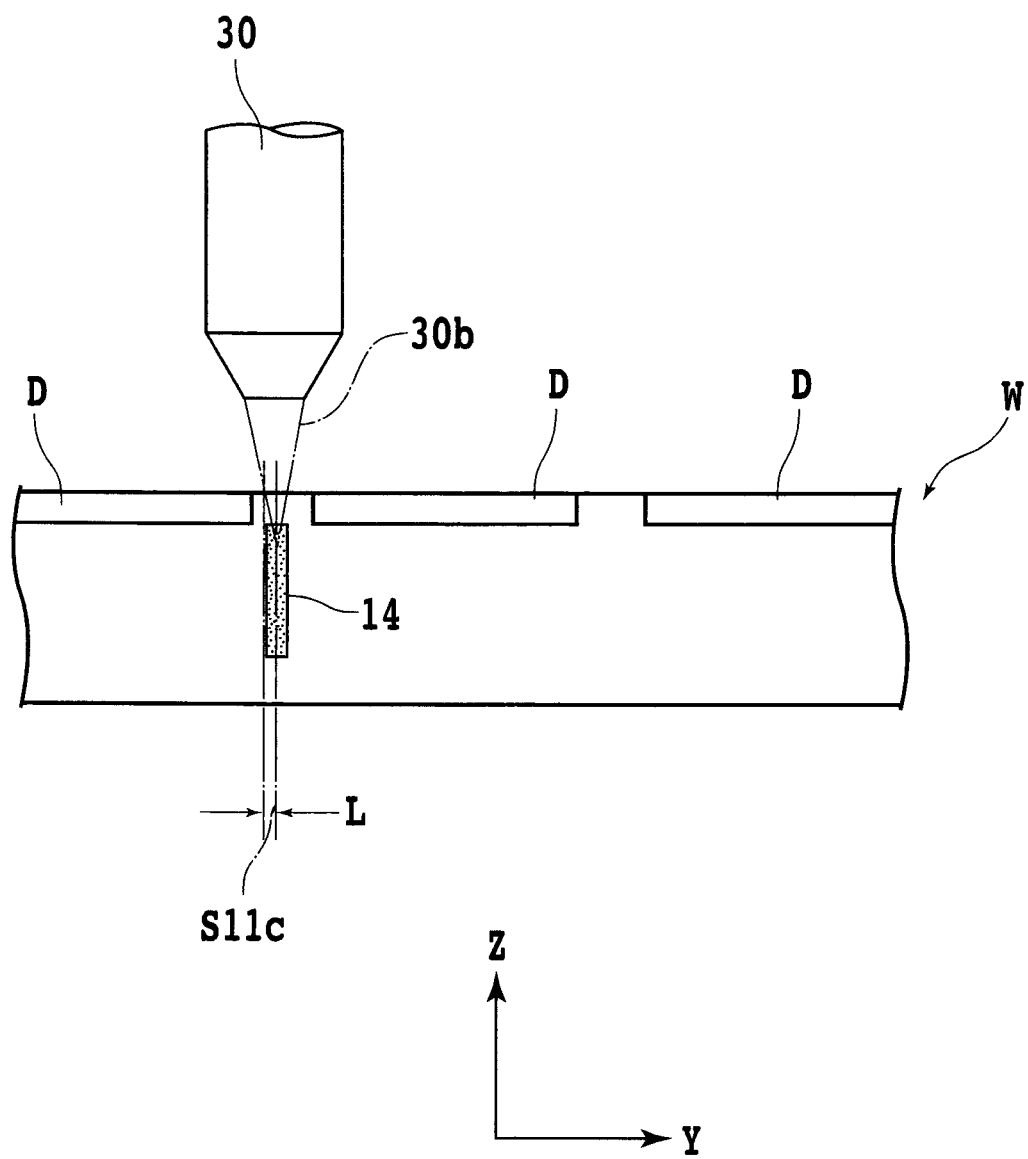
FIG. 6 is a sectional view showing schematically a state in which a main machining alteration region is formed.

In the main machining step, the workpiece W is irradiated with the pulsed laser beam along the planned dividing lines S in the device formation region 10, whereby alteration regions to be starting points of division are formed in the inside of the workpiece W. First, based on the position information on the planned dividing line S acquired in the position information acquisition step, the irradiation head 30 is positioned on the upper side of the planned dividing line S in the device formation region 10. Then, the control means 4 reads the deviation L as the machining position correction information stored in the correction information acquisition step, and corrects the position of the irradiation head 30 in the Y-direction by the deviation L with reference to the position information on the planned dividing line S. After the position of the irradiation head 30 is thus corrected, the pulsed laser beam 30b is condensed to a predetermined depth in the inside of the workpiece W, and the holding means 2 is moved in the X-direction, whereby the main machining alteration region 14 is formed as shown in FIG. 6, within the range of the device formation region 10. For example, the output of the pulsed laser beam 30b is set to 0.17 W, the wavelength is set to 1064 nm, which is a wavelength permitting transmission through silicon, and the repetition frequency is set to 80 kHz. In addition, the moving speed of the holding means in the X-direction (machining rate) is set to 180 mm/s, and the condensing position of the pulsed laser beam 30b is set to −33.5 µm in the depth direction with reference to the surface W1.

After the main machining alteration region 14 is thus formed at a proper position with reference to a specified one of the planned dividing lines S, similar irradiation with the pulsed laser beam is repeated while performing indexing feeding of the irradiation head 30 in the Y-direction by the spacing between the adjacent two planned dividing lines at a time. By this, the main machining alteration regions 14 can be accurately formed with respect to the plurality of planned dividing lines S. After the main machining alteration regions 14 corresponding to all the planned dividing lines S are formed, an external force is applied to the main machining alteration regions 14, whereby the workpiece W is divided into individual devices D.

The pre-machining step of paragraph (2) above and the correction information acquisition step of paragraph (3) above may be carried out at arbitrary timing. For example, a process may be adopted in which after the main machining alteration regions are formed with respect to a certain number of planned dividing lines S in one wafer, the main machining is stopped, then the pre-machining step and the correction information acquisition step are carried out to obtain machining position correction information, and, in the main machining step conducted later, the main machining alteration regions are formed using the newest machining position correction information. Or, alternatively, another process may be adopted in which after division of a certain number of wafers is finished and before the next wafer division is started, the pre-machining step and the correction information acquisition step are carried out to obtain machining position correction information, and, thereafter, the main machining step is carried out using the machining position correction information.

In forming the pre-machining alteration region, it is important that (a) the alteration layer is formed at a position as close as possible to the surface W1, for the purpose of imaging the alteration layer more clearly, and that (b) cracking is avoided. Therefore, the machining conditions in forming the pre-machining alteration regions are preferably so set that, for example, (c) the output of the pulsed laser beam is lower, and (d) the condensing position of the pulsed laser beam is nearer to the surface of the workpiece, as compared with the machining conditions in forming the main machining alteration regions.

Besides, in forming the main machining alteration regions, the machining position correction information acquired in the correction information acquisition step is utilized, whereby the position of irradiation with the pulsed laser beam can be corrected to a proper position. Consequently, the workpiece can be cut accurately along the planned dividing lines, to be divided into the individual devices.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of dividing a workpiece, the workpiece having on its surface a device formation region in which devices are formed in regions demarcated by a plurality of planned dividing lines formed in a grid pattern and a device non-formation region which surrounds the device formation region, the method comprising the steps of:
   irradiating the device non-formation region with a pulsed laser beam having such a wavelength as to be transmitted through the workpiece, thereby to form a pre-machining alteration region in the inside of the workpiece in the device non-formation region, wherein said irradiating stops prior to reaching the device formation region such that the pre-machining alteration region is not formed between adjacent devices;
   imaging the pre-machining alteration region by imaging means using infrared rays, thereby to detect a deviation between the position of irradiation with the laser beam and the position of the planned dividing line as machining position correction information; and
   correcting the position of irradiation with the laser beam on the basis of the machining position correction information and irradiating the workpiece with a pulsed laser beam having such a wavelength as to be transmitted through the workpiece, along the planned dividing line, to thereby form a main machining alteration region serving as a starting point of division.

* * * * *